US007039437B2

(12) United States Patent
Kojola et al.

(10) Patent No.: US 7,039,437 B2
(45) Date of Patent: May 2, 2006

(54) INTERNAL BROADCAST RECEPTION SYSTEM FOR MOBILE PHONES

(75) Inventors: Ilkka Tarmo Kojola, Salo (FI); Mika Juhani Tuominen, Paimio (FI)

(73) Assignee: Nokia Corporation, Espoo (FI)

( * ) Notice: Subject to any disclaimer, the term of this patent is extended or adjusted under 35 U.S.C. 154(b) by 578 days.

(21) Appl. No.: 09/954,619

(22) Filed: Sep. 17, 2001

(65) Prior Publication Data

US 2003/0054855 A1 Mar. 20, 2003

(51) Int. Cl.
*H04M 1/00* (2006.01)

(52) U.S. Cl. .............................. 455/550.1; 455/556.1; 455/553.1; 343/702

(58) Field of Classification Search ............ 455/550.1, 455/575.7, 553.1, 129; 343/702, 795, 700 MS, 343/787

See application file for complete search history.

(56) References Cited

U.S. PATENT DOCUMENTS 4,001,696 A * 1/1977 Bannerman ................. 455/144
4,409,688 A * 10/1983 Baker ....................... 455/165.1
5,134,422 A * 7/1992 Auriol ........................ 343/895
6,028,567 A * 2/2000 Lahti .......................... 343/895
6,046,703 A 4/2000 Wang et al. ................ 343/795

FOREIGN PATENT DOCUMENTS

EP 576012 A2 * 12/1993
EP 946011 A2 * 9/1999
GB 2 358 991 A 8/2001
JP 359169207 A * 9/1984
JP 408046669 A * 2/1996
SE WO 98/49742 * 11/1998

* cited by examiner

*Primary Examiner*—Melur Ramakrishnaiah
(74) *Attorney, Agent, or Firm*—Ware, Fressola, Van Der Sluys & Adolphson LLP; Bradford Green

(57) ABSTRACT

An integrated reception system for use in a mobile phone for receiving FM/digital broadcast signals. The reception system, which is installed within the phone body, includes a substrate, an antenna having a meandering pattern disposed on the substrate for receiving the broadcast signals, and a pre-processing module disposed on the substrate and connected to the antenna for pre-processing the received signals. The pre-processing module may include a passive filtering network for band-tuning, and an active amplifier for amplifying the received signals from the antenna. The mobile phone has components for converting the received signals into audio signals to produce audio sound.

25 Claims, 11 Drawing Sheets

INTERNAL BROADCAST RECEPTION SYSTEM FOR MOBILE PHONES

FIELD OF THE INVENTION

The present invention relates generally to an internal antenna for use in a handheld device such as a mobile phone and, more particularly, to an internal reception system for receiving FM/digital broadcast signals.

BACKGROUND OF THE INVENTION

It is known that frequency-modulation (FM) broadcast signals are commonly transmitted with carrier waves in the frequency range of 88–108 MHz. FM broadcasting is also referred to as very high frequency (VHF) radio broadcasting. To receive the FM broadcast signals, a quarter-wave antenna having a length in the order of 85 cm is required. In order to accommodate such a length, hand-held devices usually use external antennas, such as telescope-type antennas and head-set wires for FM broadcast reception. The major disadvantages of such external antennas are that they are visibly obtrusive and they increase the weight and the size of the hand-held device. In particular, when a mobile phone is equipped with an FM-broadcast reception system, it is undesirable to have an external antenna protruding out of the phone body, or to require the phone user to use a head-set in order to receive the FM broadcast signals.

It is thus advantageous and desirable to provide an internal antenna in a mobile phone for receiving FM broadcast signals. The same antenna can also be used to receive digital broadcast signals.

SUMMARY OF THE INVENTION

It is a primary objective of the present invention to provide an internal FM/digital-broadcast reception system for use in a hand-held telecommunication device, such as a mobile phone. The entire reception system can be disposed within the housing of the mobile phone without external parts connecting to the reception system. The reception system is lightweight, cost effective, easy to produce, and can be easily interfaced with other mechanical and electronic components in the mobile phone. The above objective can be achieved by integrating an FM/digital antenna with necessary signal processing electronics on a common substrate, which has a small size to be disposed entirely within the housing of the mobile phone.

Accordingly, the first aspect of the present invention is an integrated reception system for use in a hand-held telecommunication device for receiving frequency-modulation broadcast signals or digital broadcast signals, wherein the hand-held telecommunication device has a device body. The integrated reception system comprises:

an electrically non-conductive substrate located inside the device body;

an electrically conductive element, disposed on the substrate, for receiving the frequency-modulation broadcast signals or digital broadcast signals; and a signal processing module disposed on the substrate and electronically connected to one end of the electrically conductive element, responsive to the received signals, for processing the received signals.

According to the present invention, the hand-held telecommunication device includes a chassis for disposing telecommunication components. The substrate can be a part of the chassis or a separate part but mechanically and electrically connected to the chassis.

According to the present invention, the electrically non-conductive substrate can be rigid or flexible.

According to the present invention, the electrically conductive element may have a meandering pattern in order to reduce the size of the electrically non-conductive substrate.

According to the present invention, the electrically conductive element may be wound around the electrically non-conductive substrate so as to reduce the physical size of the electrically conductive element and, therefore, the size of the electrically non-conductive susbstrate.

According to the present invention, the signal processing module may include a band-tune circuit for selecting a frequency band.

According to the present invention, the signal processing module may include an active amplifier to amplify the received signals.

According to the second aspect of the present invention, a mobile phone capable of receiving broadcast signals. The mobile phone comprises:

a housing; and an integrated reception system, disposed within the housing, wherein the reception system comprises:

an electrically non-conductive substrate located inside the housing;

an electrically conductive element, disposed on the substrate, for receiving broadcast signals; and a signal processing module disposed on the substrate and electronically connected to one end of the electrically conductive element, responsive to the received signals, for processing the received signals.

According to the present invention, the broadcast signals are frequency-modulated broadcast signals, and the signal processing module may include a tuning circuit for selecting a channel and a demodulating device for converting the broadcast signals to audio signals.

According to the present invention, the broadcast signals are digital broadcast signals and the hand-held telecommunication device includes a digital signal processing device for selecting a channel from the broadcast signals and for controlling a gain of the broadcast signals.

The present invention will become apparent upon reading the description taking in conjunction with FIGS. 1*a* to 7.

DETAILED DESCRIPTION OF THE INVENTION

Figures 1A, 1B, 1C:
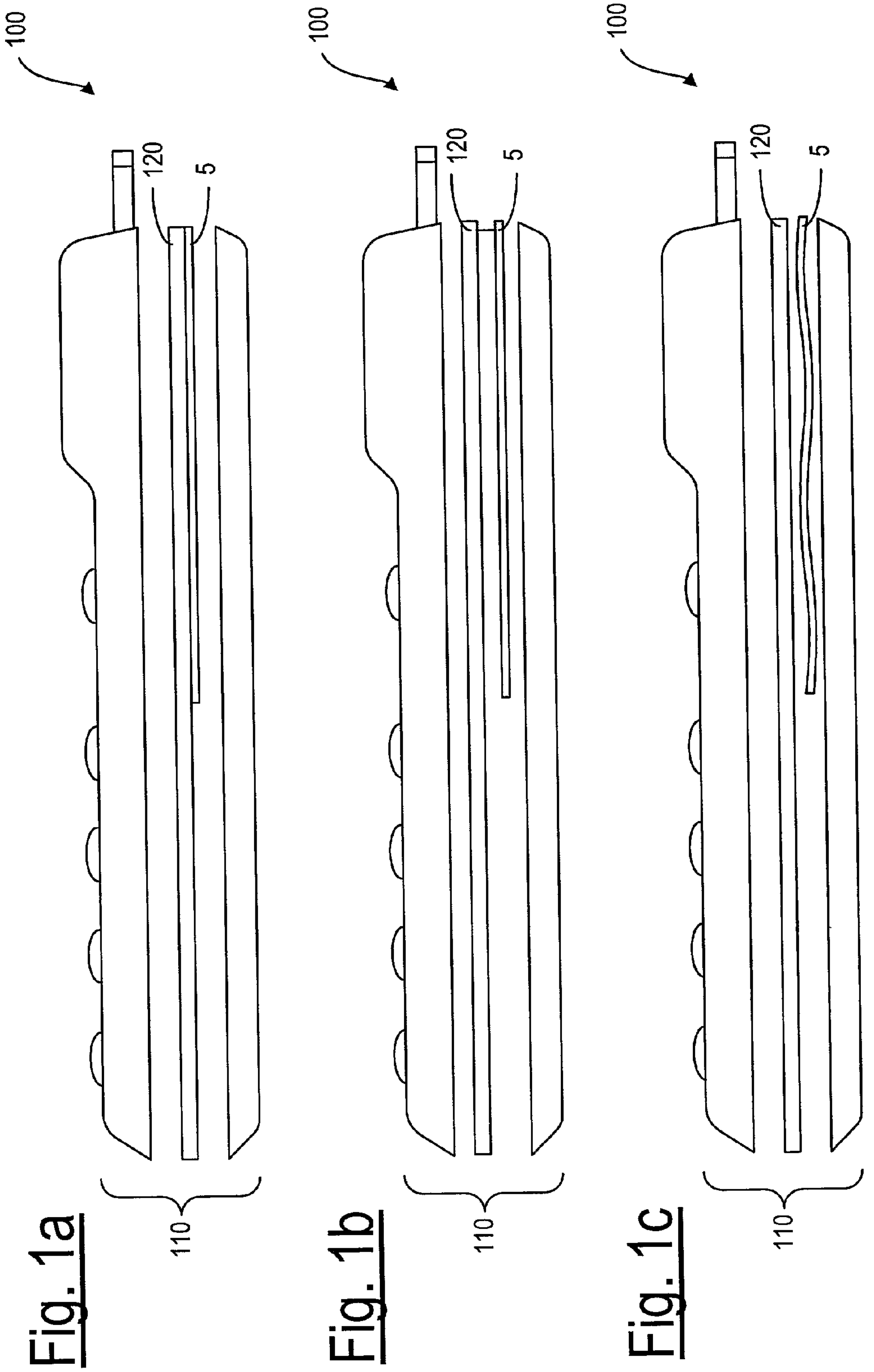
FIG. 1*a* is an exploded view of a mobile phone showing a chassis in the housing of the mobile phone, wherein the integrated FM/digital broadcast reception system is disposed on the chassis.
FIG. 1*b* is an exploded view showing the integrated FM/digital broadcast reception system being separated from the chassis, wherein the reception system has a rigid substrate.
FIG. 1*c* is an exploded view showing a flexible substrate.

The basic components of the integrated FM/digital broadcast reception system 1, according to the present invention, include an antenna 10 directly connected to a preprocessing module 20. The antenna 10 and pre-processing module 20 are disposed on a substrate 5, as shown in FIGS. 2*a* and 2*b*. The antenna 10 can be printed on the substrate 5 or etched out from a ground plane 60 of a printed circuit board (PCB) or a printed wire board (PWB). As such, the integrated reception system 1 is easy to produce and install in a hand-held telecommunication device such as a mobile phone 100, as shown in FIGS. 1*a*–1*c*.

Figure 2A:
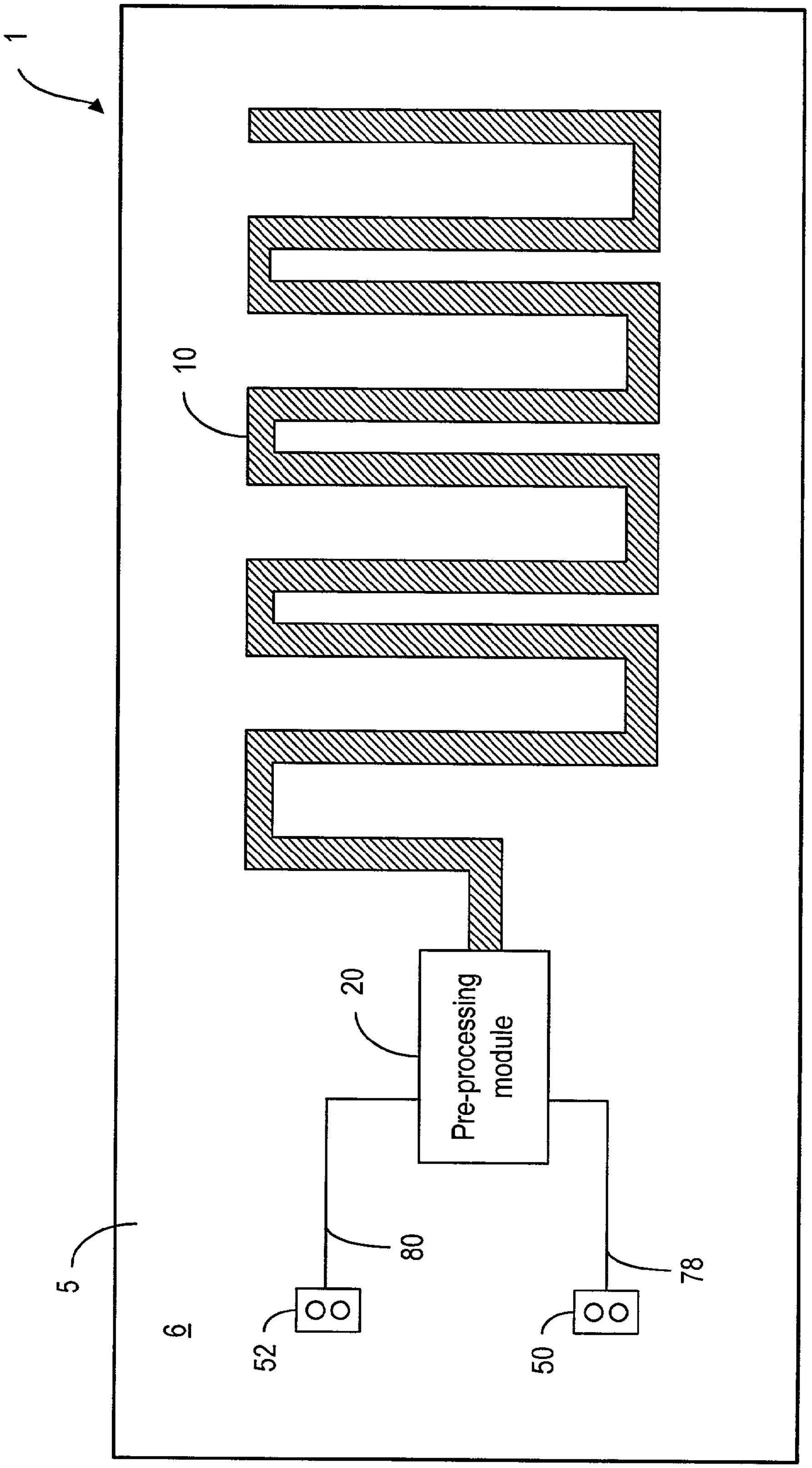
FIG. 2*a* is a diagrammatic representation illustrating an antenna and a preprocessing module being disposed on the same side of the substrate.
Figure 2B:
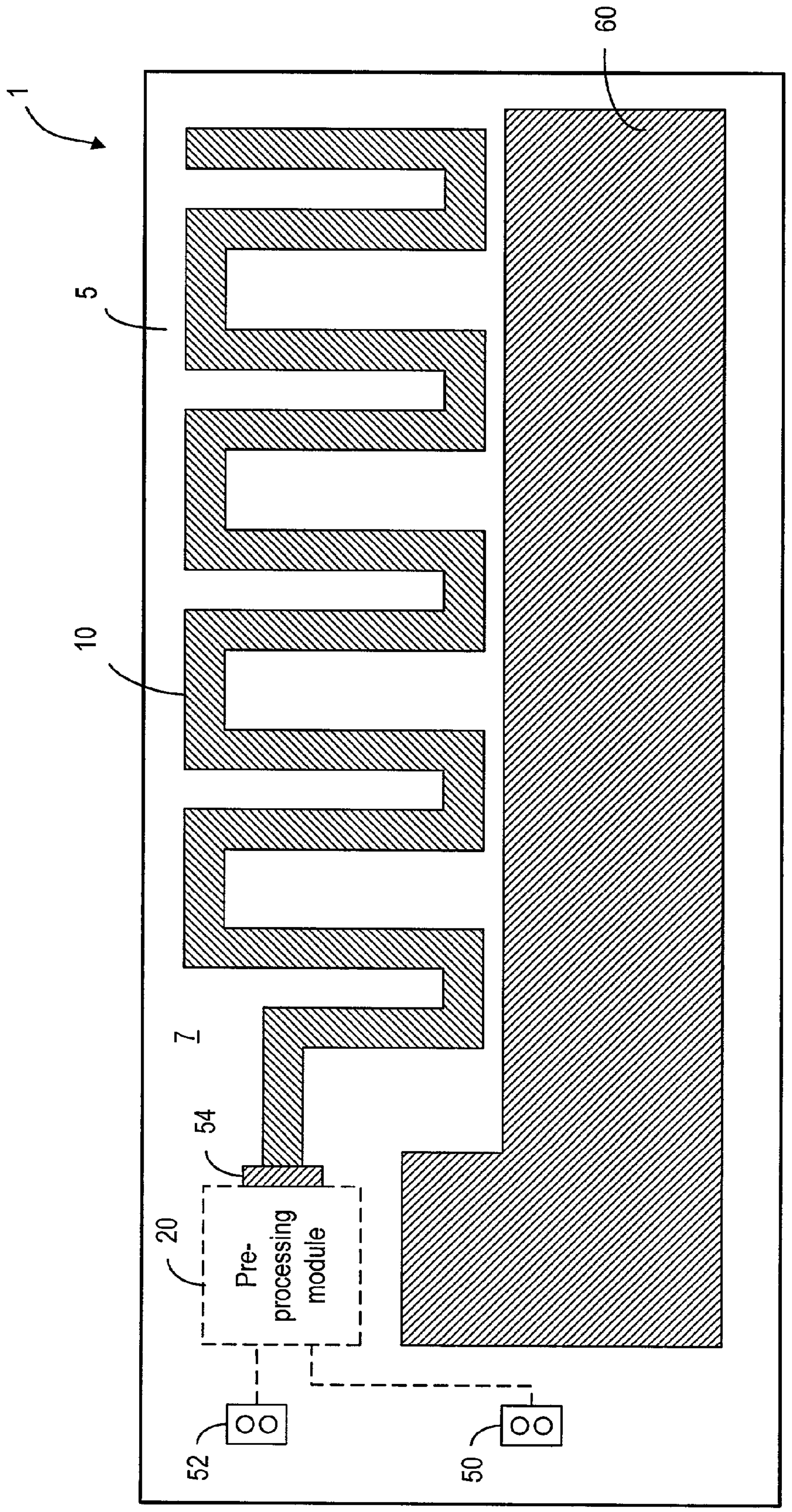
FIG. 2*b* is a diagrammatic representation illustrating the antenna and the preprocessing module being disposed on opposite sides of the substrate.

As shown in FIGS. 1*a*–1*c*, the mobile phone 100 has a phone body or housing 110, and a chassis 120 on which some or all electronic telecommunication components are disposed. For example, a microprocessor or ASIC is usually disposed on the chassis 120, along with a display, a SIM card reader, memory, battery and so on. The chassis is not part of the invention. The substrate 5 for accommodating the antenna 10 and the pre-processing module 20 can be an integral part of the chassis 120, as shown in FIG. 1*a*. This means that the antenna 10 can be printed on the chassis together with the connecting wires and other electrically conductive parts. Alternatively, the antenna 10 can be etched out from the ground plane of the chassis.

Figure 2C:
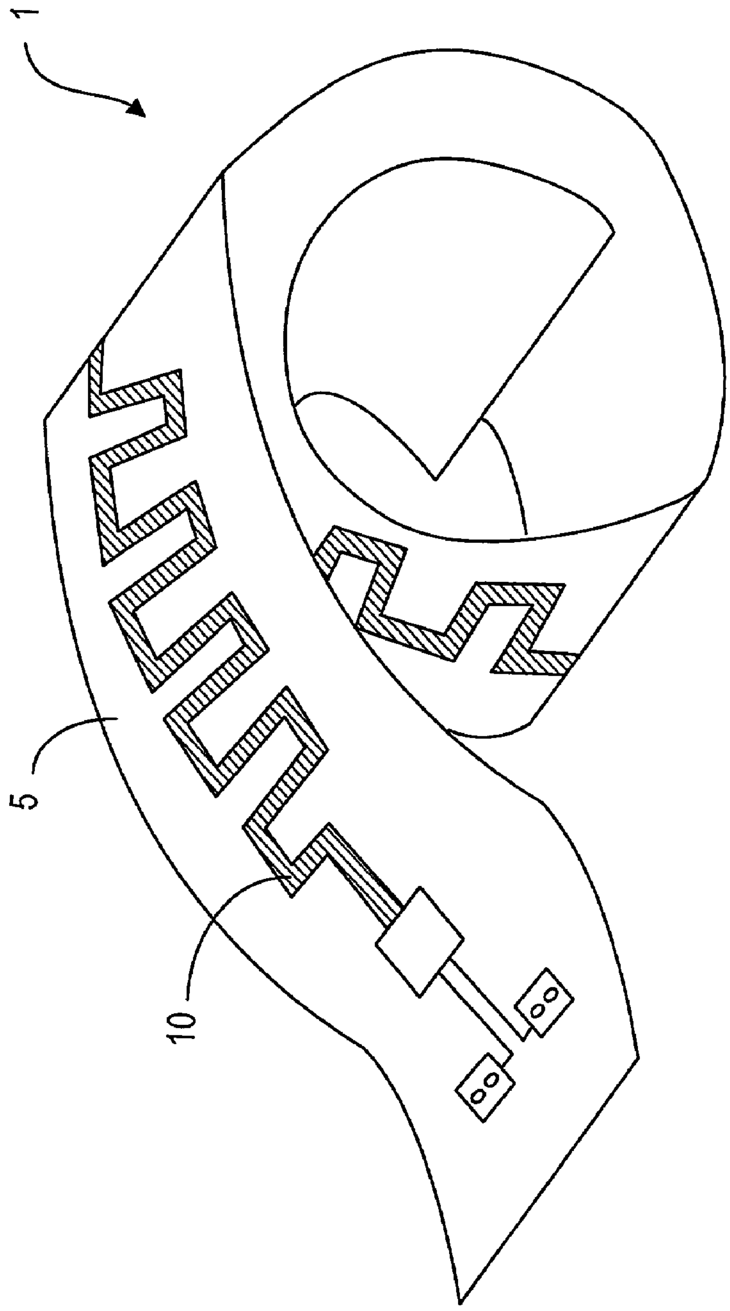
FIG. 2*c* is a diagrammatic representation illustrating the antenna and the preprocessing module being disposed on a flexible substrate.
Figure 2D:
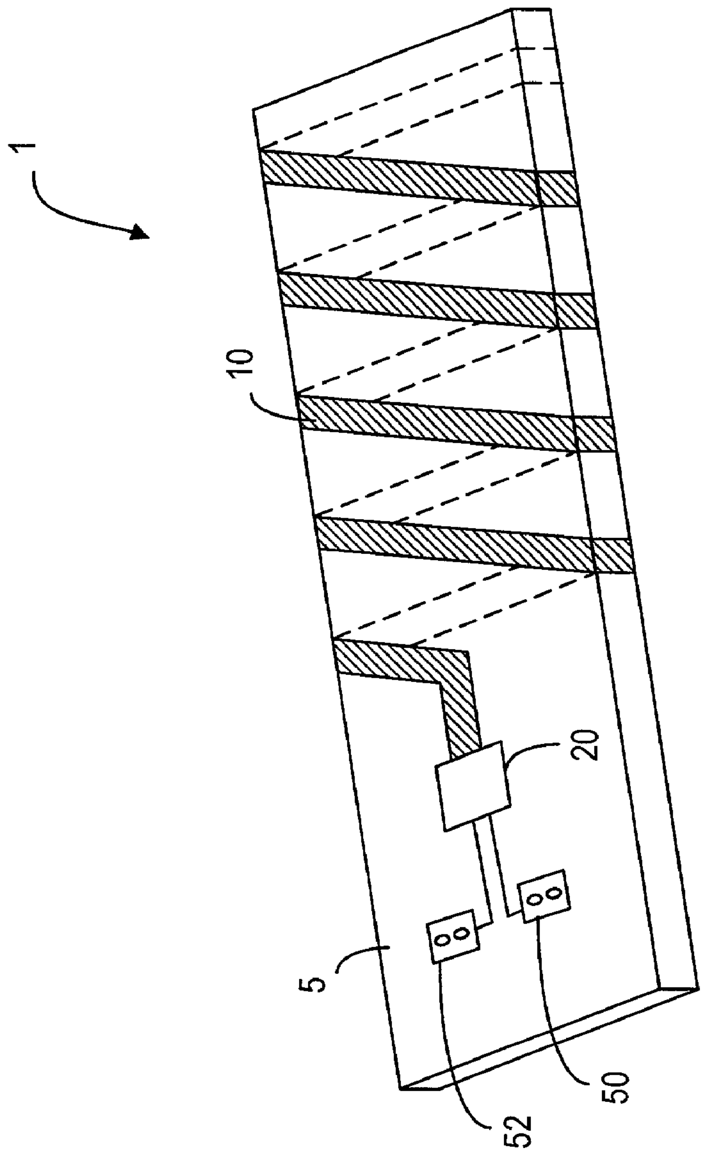
FIG. 2*d* is a diagrammatic representation illustrating the antenna being disposed on both sides of the substrate.
Figure 2E:
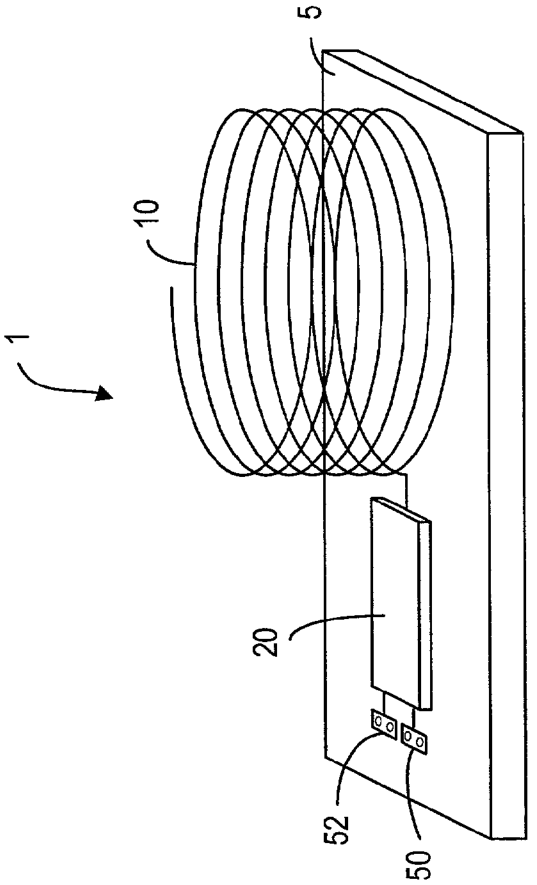
FIG. 2*e* is a diagrammatic representation illustrating a coil-like antenna.

The substrate 5 can also be a base material separate from the chassis, as shown in FIG. 1*b*. In that case, the antenna 10 and the pre-processing module 20 are produced or assembled on the substrate 5, and the substrate 5 is then mechanically and electronically connected to the chassis 120 in a separate assembling process. The substrate 5 can be a rigid piece of base material, as shown in FIG. 1*b*. Alternatively, the substrate 5 can be a flexible piece of electrically non-conductive polymer or the like, as shown in FIG. 1*c*. A flexible substrate, even with the pre-processing module 20 disposed thereon, can be folded (FIG. 2*c*) or twisted to fit in some small extra space within the housing 110. As shown in FIGS. 2*a* and 2*b*, a signal connector 50 is also provided so that pre-processed signals 78 can be conveyed to the chassis 120 of the mobile phone 100. Additionally, a power connector 52 is provided to bring power 80 to the pre-processing module 20. As shown in FIG. 2*c*, the substrate 5 is flexible such that it can be rolled up into a small volume. As shown in FIG. 2*d*, the antenna 10 is wound around the substrate 5 to form a helix occupying both sides of the substrate 5. Similarly, the antenna 10 can be disposed on the substrate 5 as a coil and the like, as shown in FIG. 2*e*. The objective of the present invention is to reduce the physical size or dimension of the antenna 10 and that of the substrate 5. If the frequency of the carrier waves is 88 MHz, then the wavelength of carrier waves is approximately 341 cm. With the present invention, the physical size of the antenna 10 and that of the substrate 5 can be made much smaller than the quarter-wavelength, or 85 cm (33.46 inches).

As shown in FIG. 2*a*, the pre-processing module 20 and the antenna 10 are disposed on the same side 6 of the substrate 5. However, they can be disposed on different sides of the substrate 5, as shown in FIG. 2*b*. As shown in FIG. 2*b*, while the antenna 10 is provided on one side 7 of the substrate 5, the pre-processing module 20 is mounted on the opposite side 6. The antenna 10 can be etched out from an existing ground plane 60 of the substrate 5.

Figure 7:
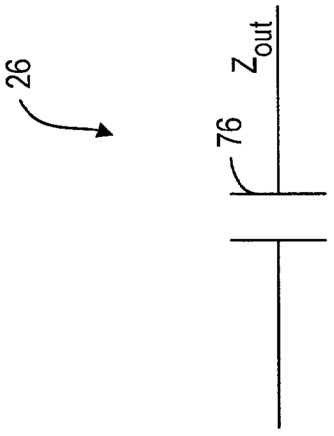
FIG. 7 is a circuit diagram illustrating an impedance matching circuit.
Figure 3:
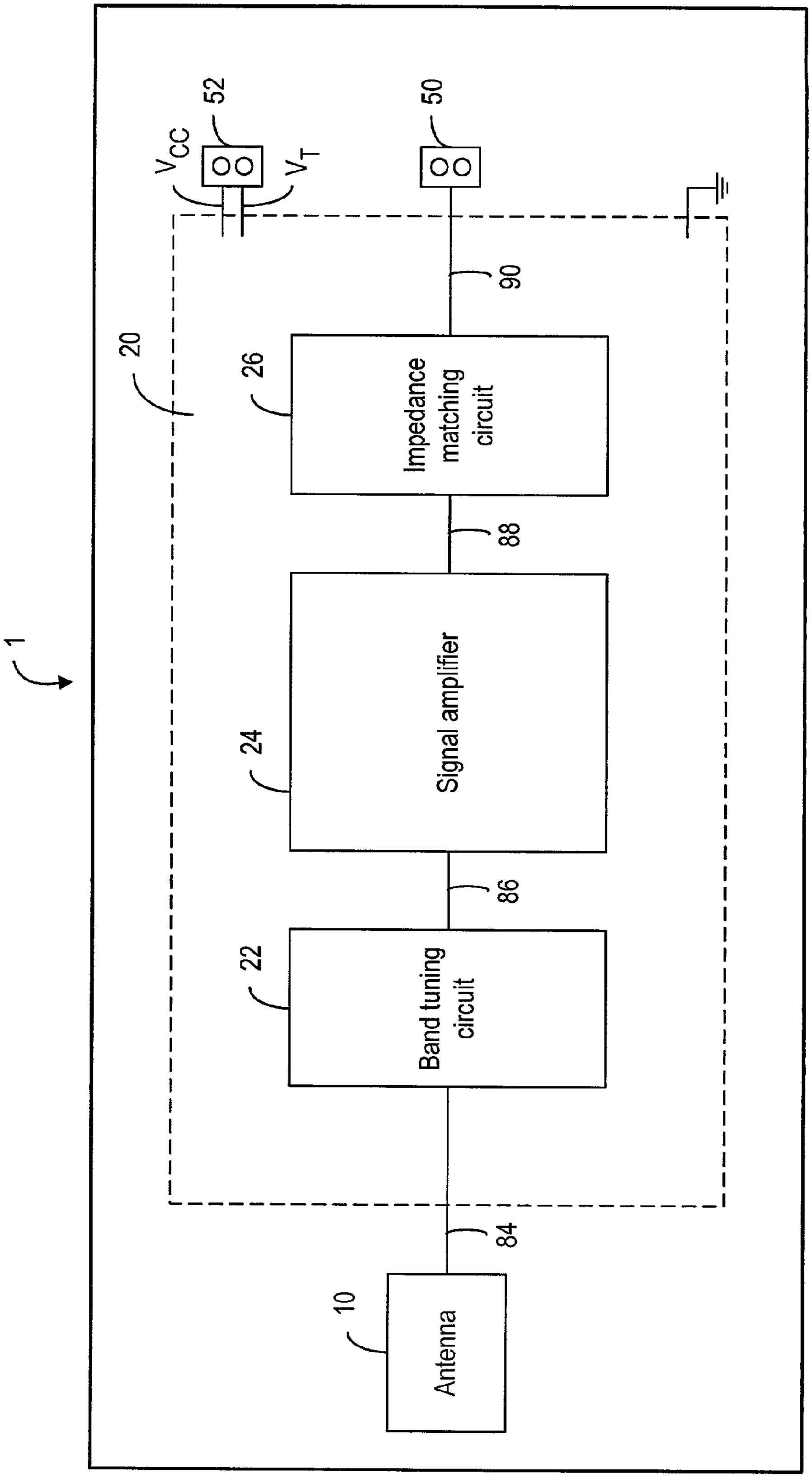
FIG. 3 is a block diagram illustrating a plurality of electrical components in the pre-processing module.
Figure 5A:
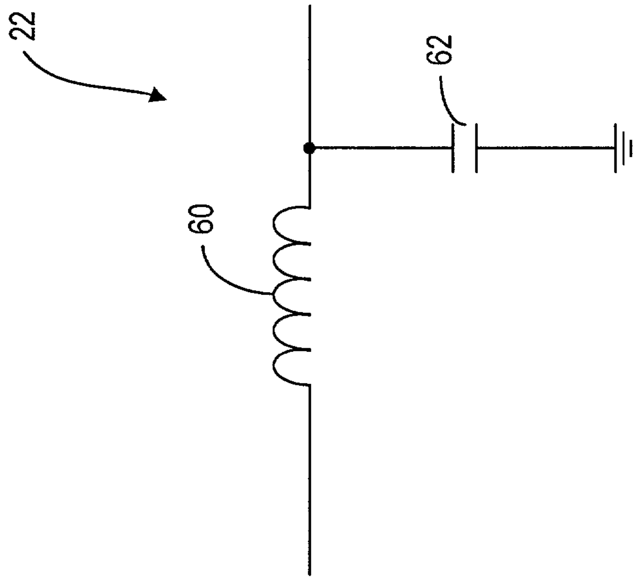
FIG. 5*a* is a circuit diagram illustrating a fixed band-tuning circuit.
Figure 5B:
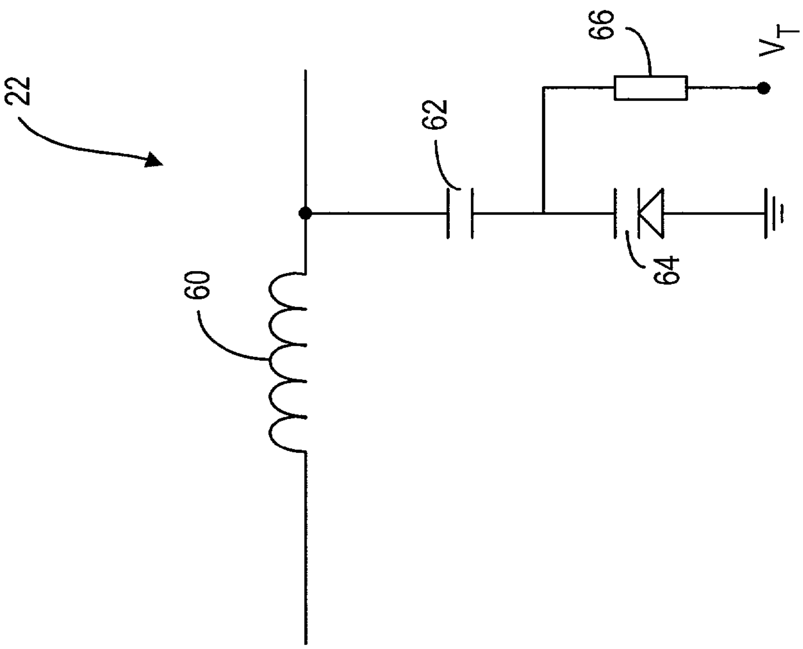
FIG. 5*b* is a circuit diagram illustrating a variable band-tuning circuit.
Figure 6B:
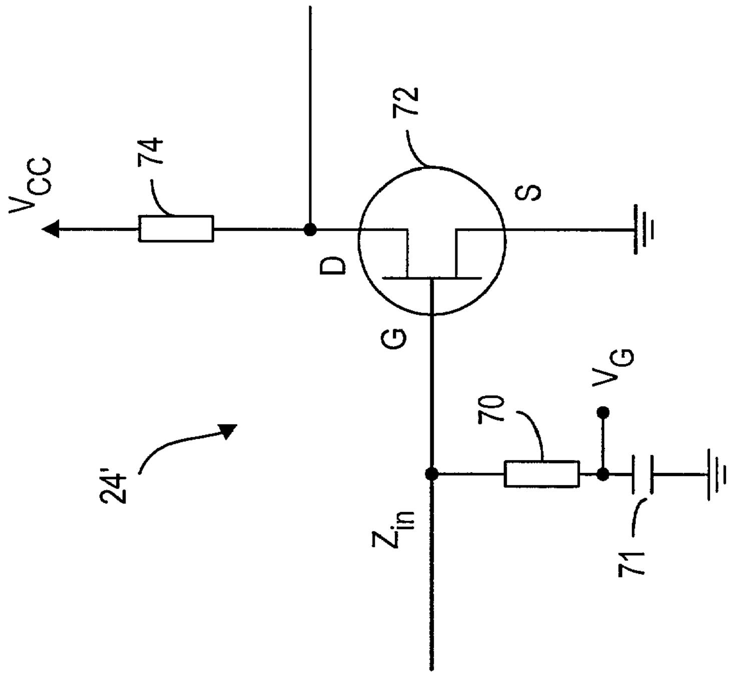
FIG. 6*b* is a circuit diagram illustrating a signal amplifier circuit having a gain control element.
Figure 6A:
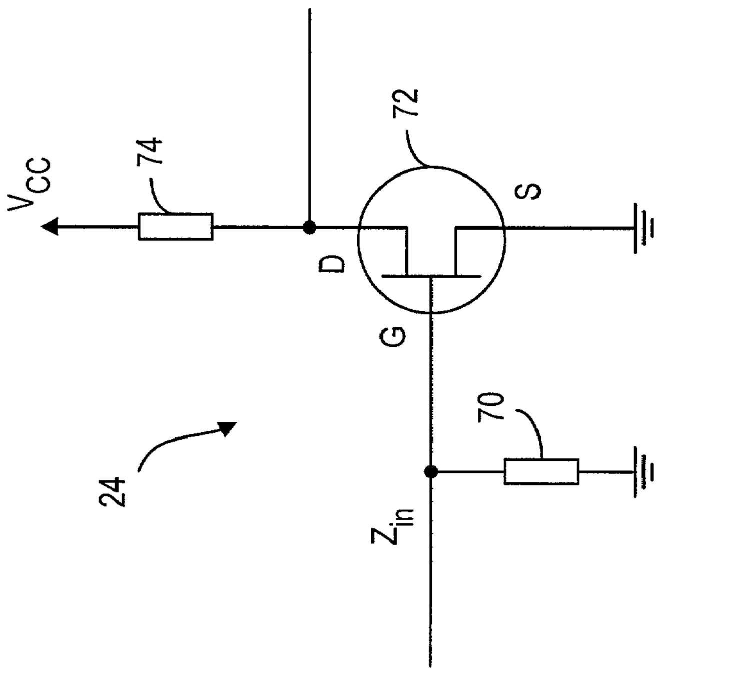
FIG. 6*a* is a circuit diagram illustrating a signal amplifier circuit.

The pre-processing module 20 is disposed together with the antenna 10 on the substrate 5 so that band-tuning and active amplification can be carried out on the same substrate. An exemplary circuit of the pre-processing module is shown in FIG. 3. As shown in FIG. 3, in order to process received broadcast signals 84 (in radio frequency) from the antenna 10, the pre-processing module 20 includes a band-tuning circuit 22, an active amplification circuit 24, and an impedance matching circuit 26. Preferably, the antenna 10 is tuned by the band-tuning circuit 22 so that the antenna 10 preselects all stations in the FM frequency band of 88–108 MHz. The band-tuned signals are denoted by reference numeral 86. Exemplary band-tuning circuits are shown in FIGS. 5*a* and 5*b*. An exemplary active amplification circuit 24 is shown in FIG. 6*a*. The amplified signals are denoted by reference numeral 88. The impedance matching circuit 26 can simply be a capacitor 76, as shown in FIG. 7. The output from the pre-processing module 20 is denoted by reference numeral 90.

Figure 4A:
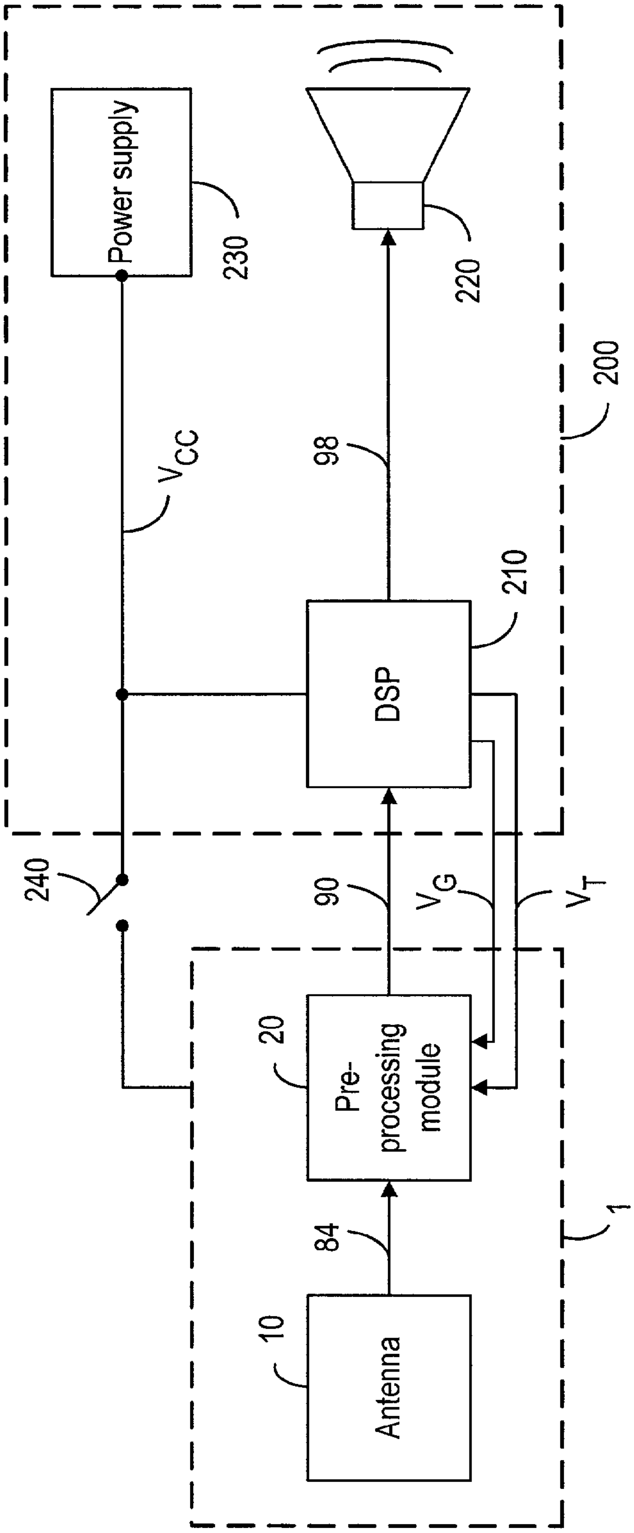
FIG. 4*a* is a block diagram illustrating the connection between the integrated digital broadcast reception system and a common part of the mobile phone.

The present invention advantageously makes use of existing components of a typical mobile phone. In a digital phone, as shown in FIG. 4*a*, existing components 200 that can be used for further processing the pre-processed signals 90 includes a digital signal processor (DSP) 210, a speaker 220 and a power supply 230. For example, the signals 90 are directly fed to an analog-to-digital converter (A/D) inside the DSP 210. The DSP 210 is also used for channel selection and demodulation. Additionally, the DSP 210 can be used to generate a tuning voltage $V_T$ for band-tuning and a gain-control voltage $V_G$ to control the gain of the active amplification circuit 24. The output 92 (in audio frequency) from the DSP 210 is then conveyed to the speaker 220 to produce audible sound. The power supply 230 of the mobile phone 100 can also be used to provide power $V_{cc}$ to the pre-processing module 20. Preferably, the power $V_{cc}$ is provided to the pre-processing module 20 only when the mobile phone 100 is switched to the broadcast receiving mode. The power $V_{cc}$ provided to the pre-processing module 20 is turned off by a switch 240 during a call. The power $V_{cc}$ provided to the pre-processing module 20 can also be switched off when the mobile phone 100 is not used to receive broadcast signals to save power.

Figure 4B:
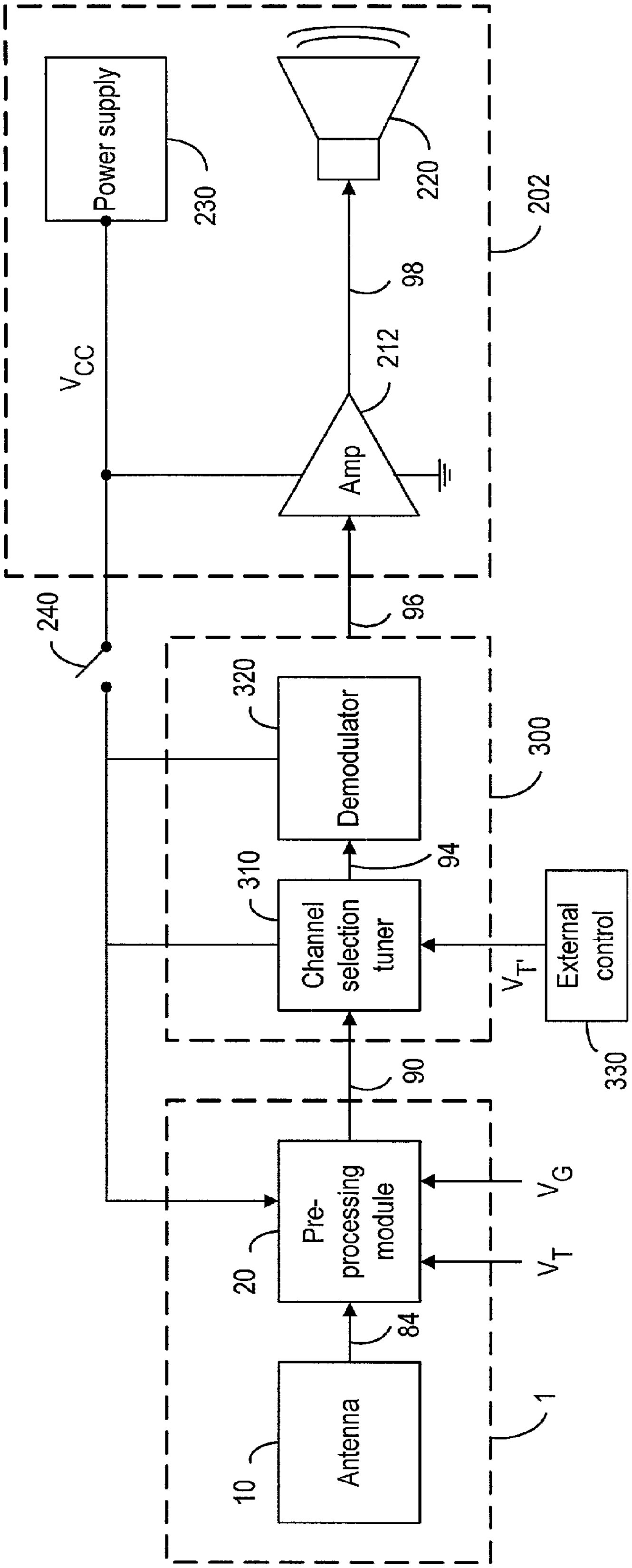
FIG. 4*b* is a block diagram illustrating the connection between the integrated analog broadcast reception system and a common part of the mobile phone.

When the mobile phone 100 is used to receive analog broadcast signals, additional components 300 are needed. As shown in FIG. 4*b*, a channel selection tuner 310 allows a user to select a channel from the pre-processed signals 90. The radio frequency signals 94, as selected by the channel selection tuner 310, are down-converted into audio signals 96 by a demodulation module 320. As it is known in the art, the demodulation module 320 may comprise a local oscillator, mixer, one or more intermediate stages, demodulator and so forth. The audio frequency signals 96 are further processed by an amplifier 212 before being conveyed to the speaker 220. The amplifier 212, the speaker 220 and the power supply 230 are the audio components 202 commonly found in a mobile phone 100. As shown in FIG. 4*b*, the channel is selected by applying a tuning voltage $V_T$, via an external control 330. Preferably, the gain control voltage $V_G$ is provided by an automatic gain control unit (AGC), which is not shown. The band-tuning voltage $V_T$, however, should be provided in the manufacturing process.

It is possible that an antenna of a selected size can be used with a resonance circuit to select the frequency band. For example, an LC circuit, as shown in FIG. 5*a*, having a fixed inductor 60 and a fixed capacitor 62 can be used for band-tuning. However, antennas in different mobile phones can be of different sizes. Thus, these antennas must be tuned for band selection. For that purpose, it is possible to add a varicap 64 in the LC circuit, as shown in FIG. 5*b* so that antennas of different sizes can be used with a similar pre-processing module 20. In order to tune the antenna 10, a band-tuning voltage $V_T$, generated by the DSP 210, is fed to the varicap 64 via a resistor 66, as shown in FIG. 5*b*.

FIG. 6*a* shows an exemplary signal amplification circuit 24. As shown in FIG. 6*a*, an FET 72 and two resistors 70 and 74 are used to form a single-stage amplifier. In FIG. 6*a*, $Z_{in}$ denotes input impedance of the amplifier. If necessary, an output impedance $Z_{out}$ is provided with a capacitor 76, as shown in FIG. 7, such that $Z_{in}>>Z_{out}$. It is preferred that the capacitor 76 is located within the DSP 210. Because the output impedance $Z_{out}$ of the FET stage depends also on the drain resistor 74, it is possible to vary the drain resistor 74 to adjust the output impedance $Z_{out}$. Furthermore, it is possible to vary the amplification factor or gain of the signal amplification circuit 24 by feeding the gain-control voltage $V_G$ to a capacitor 71 connected between the gate resistor 70 and the ground, as shown in FIG. 6*b*.

The additional components 300 can be disposed on the substrate 5, or on the chassis 120.

In summary, the present invention integrates an FM broadcast reception system inside a hand-held telecommunication device, such as a mobile phone. The FM antenna is not protruding outside of the phone body. The present invention makes reception of FM broadcast possible without using any external parts. The antenna is lightweight and cost-effective. By disposing the antenna on a substrate inside the phone body, the necessary mechanical and electrical interfacing to the phone is greatly simplified. As it is known, the FM broadcast uses the frequency range of 88 MHz–108 MHz, so as the basic digital broadcasting system. The physical size of the antenna and the substrate of the present invention is much smaller than the quarter-wavelength of the received signals in that frequency range. However, the present invention is also applicable to other frequency ranges as well. For example, the internal broadcast reception system for the present invention is also used to receive the broadcast in the 53 MHz–99 MHz, or the digital broadcast around 200 MHz.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. An integrated broadcast reception system for use in a hand-held telecommunication device for receiving broadcast signals, wherein the hand-held telecommunication device has a device body, the reception system comprising:

an electrically non-conductive substrate located inside the device body;

an electrically conductive element, disposed on the substrate, for receiving the broadcast signals; and a signal processing module disposed on the substrate adjacent and electronically connected to one end of the electrically conductive element, responsive to the received signals, for processing the received signals, wherein the broadcast signals are frequency-modulated signals, and wherein the broadcast signals are substantially in a frequency range of 88 MHz–108 MHz.

2. The broadcast reception system of claim 1, wherein the signal processing module comprises an active circuit, responsive to the received signals, for providing amplified signals.

3. The broadcast reception system of claim 2, wherein the active circuit is controllable for adjusting a gain of the amplified signals.

4. The broadcast reception system of claim 1, wherein the signal processing module comprises a band-tuning circuit, responsive to the received signals, for selecting a broadcasting frequency band for providing band-tuned signals.

5. The broadcast reception system of claim 4, wherein the signal processing module further comprises an amplification device, responsive to the band-tuned signals, for providing amplified signals.

6. The broadcast reception system of claim 1, wherein the physical length of the electrically non-conductive substrate is smaller than the a quarter-wavelength of the received signal.

7. The broadcast reception system of claim 1, wherein the electrically conductive element is disposed on at least one side of the electrically non-conductive substrate.

8. An integrated broadcast reception system for use in a hand-held telecommunication device for receiving broadcast signals, wherein the hand-held telecommunication device has a device body, the reception system comprising:

an electrically non-conductive substrate located inside the device body;

an electrically conductive element, disposed on the substrate, for receiving the broadcast signals; and a signal processing module disposed on the substrate adjacent and electronically connected to one end of the electrically conductive element, responsive to the received signals, for processing the received signals, wherein the broadcast signals are digital broadcast signals, and wherein the broadcast signals are substantially in a frequency range of 88 MHz–108 MHz.

9. The broadcast reception system of claim 8, wherein the physical length of the electrically non-conductive substrate is smaller than the a quarter-wavelength of the received signal.

10. The broadcast reception system of claim 8, wherein the electrically conductive element has a helical shape.

11. An integrated broadcast reception system for use in a hand-held telecommunication device for receiving broadcast signals, wherein the hand-held telecommunication device has a device body, the reception system comprising:

an electrically non-conductive substrate located inside the device body;

an electrically conductive element, disposed on the substrate, for receiving the broadcast signals; and a signal processing module disposed on the substrate adjacent and electronically connected to one end of the electrically conductive element, responsive to the received signals, for processing the received signals, wherein the broadcast signals are digital broadcast signals, and wherein the broadcast signals are substantially in a frequency of 200 MHz.

12. The broadcast reception system of claim 11, wherein the physical length of the electrically non-conductive substrate is smaller than the a quarter-wavelength of the received signal.

13. A mobile phone capable of receiving broadcast signals, comprising:

a housing;

an internal broadcast reception system, disposed within the housing, wherein the reception system comprises:

an electrically non-conductive substrate located inside the device body;

an electrically conductive element, disposed on the substrate, for receiving the broadcast signals; and a signal processing module disposed on the substrate adjacent and electronically connected to one end of the electrically conductive element, responsive to the received signals, for providing pre-processed signals; and means, responsive to the pre-processed signals, for providing audio signals indicative of the broadcast signals, wherein the broadcast signals are substantially in a frequency range of 88 MHz–108 MHz.

14. The mobile phone of claim 13, wherein the broadcast signals are frequency modulated and wherein said providing means comprises a tuning circuit for selecting a broadcast channel in a broadcast frequency band for providing further signals indicative of the broadcast of the selected channel.

15. The mobile phone of claim 14, wherein said providing means further comprises a converter, responsive to the further signals, for providing the audio signals.

16. The mobile phone of claim 13, further comprising a chassis within the housing for disposing said providing means, wherein the hand-held telecommunication device includes a chassis, and wherein the electrically non-conductive substrate is a part of the chassis.

17. The mobile phone of claim 16, wherein the electrically non-conductive substrate is made of a rigid material mechanically linked to the chassis and the integrated broadcast reception system is electronically linked to the chassis.

18. The mobile phone of claim 16, wherein the electrically non-conductive substrate is made of a flexible material mechanically linked to the chassis and the integrated broadcast reception system is electronically linked to the chassis.

19. The mobile phone of claim 13, wherein the electrically conductive element has a meandering or wound shape for reducing the size of the electrically non-conductive substrate.

20. The mobile phone of claim 13, wherein the broadcast signals are digital broadcast signals.

21. The mobile phone of claim 13, wherein the broadcast signals are frequency modulated signals.

22. A mobile phone capable of receiving broadcast signals, comprising:

a housing;

an internal broadcast reception system, disposed within the housing, wherein the reception system comprises:

an electrically non-conductive substrate located inside the device body;

an electrically conductive element, disposed on the substrate, for receiving the broadcast signals; and a signal processing module disposed on the substrate adjacent and electronically connected to one end of the electrically conductive element, responsive to the received signals, for providing pre-processed signals; and means, responsive to the pre-processed signals, for providing audio signals indicative of the broadcast signals, wherein the broadcast signals are substantially in a frequency range of 53 MHz–99 MHz.

23. The mobile phone of claim 22, wherein the broadcast signals are frequency modulated signals.

24. A mobile phone capable of receiving broadcast signals, comprising:

a housing;

an internal broadcast reception system, disposed within the housing, wherein the reception system comprises:

an electrically non-conductive substrate located inside the device body;

an electrically conductive element, disposed on the substrate, for receiving the broadcast signals; and a signal processing module disposed on the substrate adjacent and electronically connected to one end of the electrically conductive element, responsive to the received signals, for providing pre-processed signals; and means, responsive to the pre-processed signals, for providing audio signals indicative of the broadcast signals, wherein the broadcast signals are in a frequency range around 200 MHz.

25. A mobile phone capable of receiving broadcast signals, comprising:

a housing;

an internal broadcast reception system, disposed within the housing, wherein the reception system comprises:

an electrically non-conductive substrate located inside the device body;

an electrically conductive element, disposed on the substrate, for receiving the broadcast signals; and a signal processing module disposed on the substrate adjacent and electronically connected to one end of the electrically conductive element, responsive to the received signals, for providing pre-processed signals; and means, responsive to the pre-processed signals, for providing audio signals indicative of the broadcast signals, wherein the broadcast signals are frequency-modulated signals, and the signal processing module comprises a band-tuning circuit, responsive to the received signals, for selecting a broadcasting frequency band, wherein the selected frequency band is substantially within a range of 88 MHz and 108 MHz.

* * * * *